United States Patent [19]

Paulot et al.

[11] Patent Number: 5,750,286
[45] Date of Patent: May 12, 1998

[54] DUAL CONNECTION TAB CURRENT COLLECTOR

[75] Inventors: William M. Paulot, Lancaster; Joseph M. Probst, Williamsville; William B. Elliott, Alden, all of N.Y.

[73] Assignee: Wilson Greatbatch Ltd., Clarence, N.Y.

[21] Appl. No.: 690,007

[22] Filed: Jul. 31, 1996

[51] Int. Cl.[6] .............................. H01M 4/04; H01M 2/26
[52] U.S. Cl. ...................... 429/211; 429/242; 29/2; 29/623.4
[58] Field of Search .................... 429/241, 242, 429/211; 29/2, 623.4

[56] References Cited

U.S. PATENT DOCUMENTS

| | | |
|---|---|---|
| 757,396 | 4/1904 | Frost . |
| 1,463,788 | 8/1923 | Barna . |
| 1,529,681 | 3/1925 | Allen . |
| 1,600,083 | 9/1926 | Webster . |
| 1,947,473 | 2/1934 | Huebner ........................ 136/49 |
| 3,621,543 | 11/1971 | Willmann et al. ................. 29/2 |
| 4,555,459 | 11/1985 | Anderson et al. ............ 429/241 X |
| 5,149,605 | 9/1992 | Dougherty ...................... 429/160 |
| 5,154,993 | 10/1992 | Beatty ........................... 429/211 |
| 5,227,267 | 7/1993 | Goebel et al. ............. 429/211 X |
| 5,250,373 | 10/1993 | Muffoletto et al. ............. 429/161 |
| 5,601,953 | 2/1997 | Schenk .......................... 429/241 |

Primary Examiner—Stephen Kalafut
Attorney, Agent, or Firm—Hodgson, Russ, Andrews, Woods & Goodyear LLP

[57] ABSTRACT

A current collector for an electrochemical cell is described. The current collector has both external and internal connection tabs which are preferably contiguous with each other and provide for increased flexibility in connecting a cell terminal lead directly to any contact point along the extent of the two connection tabs.

31 Claims, 2 Drawing Sheets

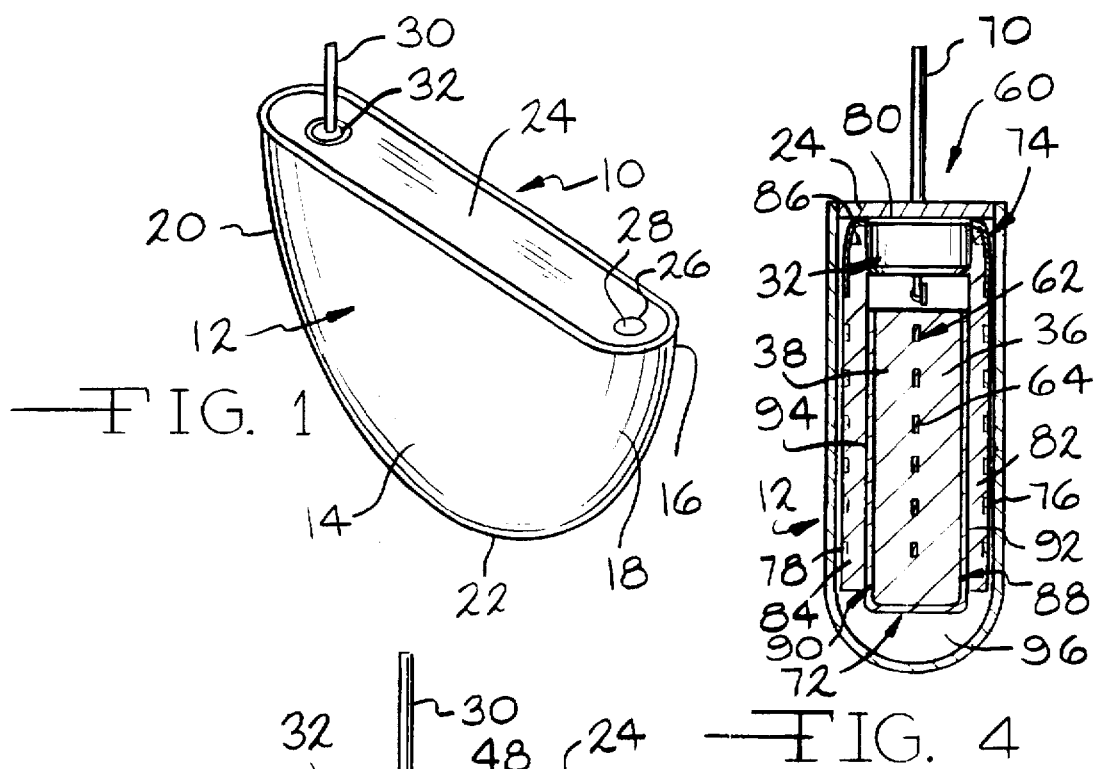
FIG. 1
FIG. 4
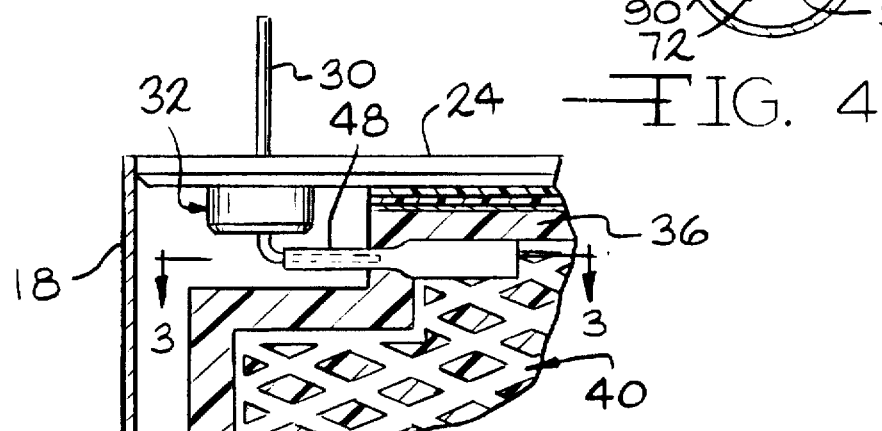
FIG. 2
PRIOR ART
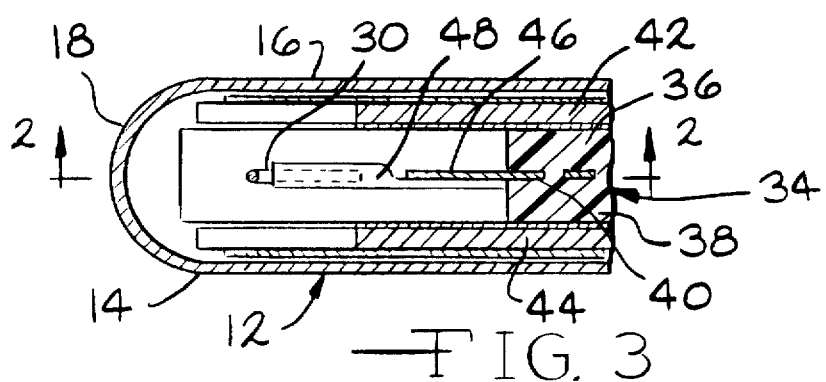
FIG. 3
PRIOR ART

DUAL CONNECTION TAB CURRENT COLLECTOR

BACKGROUND OF THE INVENTION

1. Field of the Invention

The present invention relates to the art of electrochemical cells, and more particularly, to a new and improved dual tab current collector. Further, the present invention relates to an electrode comprising the dual tab current collector, and a method of providing the electrode and an electrochemical cell incorporating the same.

The current collector of the present invention comprises both an external connection tab and an internal connection tab for selective connection to a terminal lead. Preferably the two connection tabs are continuous in that the external tab is contiguous with the internal tab. This structure provides for flexibility in connecting the terminal lead directly to any contact point along the length of the connection tab means.

2. Prior Art

The recent rapid development in small-sized electronic devices having various shape and size requirements requires comparably small-sized electrochemical cells of different designs that can be easily manufactured and used in these electronic devices. Preferably the electrochemical cell has a high energy density, and one commonly used cell configuration is a prismatic, case-negative cell design having an intermediate cathode flanked by opposed anode plates in contact with the casing and in electrical association with the cathode.

A perspective view of a prismatic electrochemical cell 10 design is shown in FIG. 1 including a casing 12 having spaced-apart front and back side walls 14 and 16 joined by curved end walls 18 and 20 and a curved bottom wall 22. The open top of casing 12 is closed by a lid 24. Lid 24 has an opening 26 that serves as a fill port; it is used for filling the casing 12 with an electrolyte after the cell components have been assembled therein and lid 24 has been welded to casing 12. In its fully assembled condition shown in FIG. 1, a closure means 28 is hermetically sealed in opening 26 to close the cell. A cathode terminal lead 30 is electrically insulated from lid 24 and casing 12 by a glass-to-metal seal 32, as is well known to those skilled in the art.

The present state-of-the-art construction for connecting the cathode terminal lead 30 to a cathode current collector in a prismatic cell is described in U.S. Pat. No. 5,250,373 to Muffoletto et al., which is assigned to the assignee of the present invention and incorporated herein by reference. In the prior art cell of Muffoletto et al., as shown in FIGS. 2 and 3, casing 12 houses a cathode electrode, generally designated 34, in electrical association with an anode electrode. Cathode electrode 34 comprises plates 36, 38 pressed together and bonded against a cathode current collector 40 and the anode electrode comprises anode plates 42 and 44 in operative contact with the respective cathode plates 36, 38. The cathode current collector 40 is provided with a tab 46 extending outwardly therefrom. A distal end of tab 46 is welded to one end of a coupling element 48, comprising a tube which receives the inner end of the terminal lead 30 welded therein. Lead 30 provides external electrical connection to the cathode electrode 34 while the casing 12 and lid 24 are in electrical contact with the anode electrode and serve as the anode terminal for the case-negative electrochemical cell 10.

While this prior art construction provides a reliable means of connecting the cathode terminal lead 30 to the current collector 40, the use of the coupling tube 48 does not provide much flexibility in selecting the connection point on the tab 46 due to space limitations inside the cell. In other words, if it is desired to change the position of the terminal lead 30, for example, to modify the electrochemical cell to a different shape and/or design for powering variously shaped and small-sized electronic devices, it is difficult to provide such flexibility with the prior art terminal lead 30, coupling element 48 and current collector subassembly 40, 46. Thus, there exists the need for an electrochemical cell wherein the terminal lead for at least one of the electrodes can be selectively attached or connected to various contact points along the length of the connection tab means of the electrode current collector.

SUMMARY OF THE INVENTION

The present invention relates to a current collector for an electrode of an electrochemical cell, the current collector comprising a support surface for contact with electrode active material, an external wing-like tab, and an internal tab in the form of a land contiguous with the external tab and integrated with the support surface. Such a configuration provides for directly connecting the terminal lead to the current collector, thereby eliminating the coupling tube of the prior art construction. The novel concept of the present invention thus resides in the provision of the current collector having an internal connection tab and an external connection tab which can be both utilized for direct connection to the terminal lead.

Elimination of the coupling tube as a means for connecting the terminal lead to the current collector is advantageous for several reasons. In typical prior art cells, such as those described in the previously referenced U.S. Pat. No. 5,250,373 to Muffoletto et al., the coupling tube is generally of molybdenum and the terminal pin is titanium. It is often difficult to connect these materials together, such as by welding, to form an integral unit. Also, the present current collector saves space which allows for reducing the size of the cell, is a stock element that can be incorporated into variously shaped and sized cells, provides for the possibility of different designs for devices powered by a cell incorporating the novel current collector, and the present current collector provides for using a variety of terminal pin materials that can be attached directly to the internal and external connection tabs.

The foregoing and additional advantages and characterizing features of the present invention will become clearly apparent upon a reading of the following detailed description together with the included drawings.

BRIEF DESCRIPTION OF THE DRAWING FIGURES

FIG. 1 is a perspective perspective view of a prismatic electrochemical cell 10.

FIG. 2 is a partial cross-sectional view of a cell having a current 40 collector connected to a terminal lead 30 through a coupling element 48 according to the prior art.

FIG. 3 is a cross-sectional view taken along line 3—3 of FIG. 2.

FIG. 4 is a cross-sectional view of an electochemical cell 60 according to the present invention.

Figure 6:
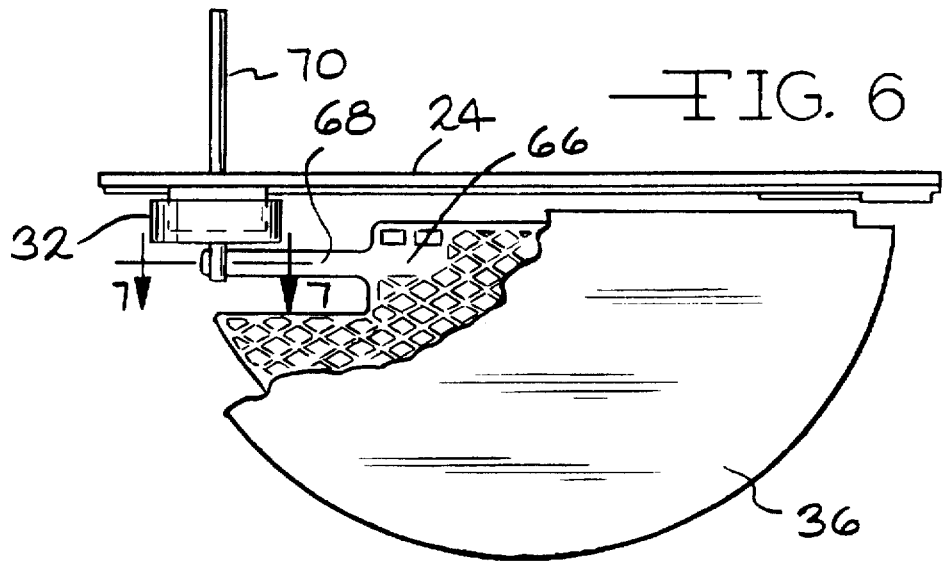

FIG. 6 is a perspective view with parts broken away of the current collector 62 connected to lead 70 and showing cathode plate 36.

Figure 7:
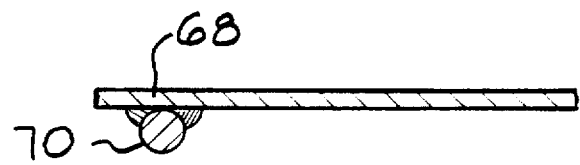

FIG. 7 is a cross-sectional view taken along line 7—7 of FIG. 6.

DETAILED DESCRIPTION OF THE ILLUSTRATED EMBODIMENT

Referring now to FIGS. 4 to 7, there is shown an electrochemical cell 60 incorporating a cathode current collector 62 (FIGS. 5 and 6) according to the present invention. In perspective, electrochemical cell 60 is similar to the prismatic electrochemical cell 10 previously described in the Prior Art section with respect to U.S. Pat. No. 5,250,373 to Muffoletto et al. However, cell 60 has been modified to include the dual tab current collector 62 of the present invention. In that respect, those parts or members which are the same in the prior art cell (FIGS. 2 and 3) and the electrochemical cell 60 of the present invention are provided with the same numerical designations.

Figure 5:
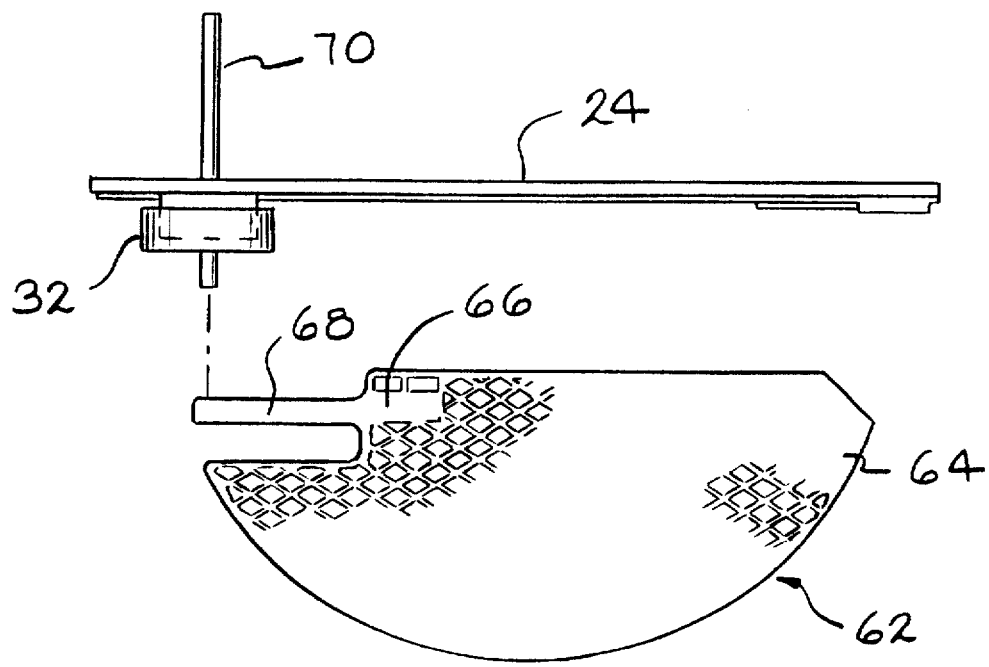
FIG. 5 is an exploded view of the current collector 62 of the present invention and a terminal lead 70.

As shown in FIGS. 5 and 6, the current collector 62 of the present invention generally comprises a grid 64, an internal connection tab 66 in the form of a land that is co-planar with and surrounded on three sides by grid 64, and an integral external connection tab 68. External connection tab 68 is an outwardly extending continuation of internal tab 66. FIG. 7 further illustrates the connection of a terminal lead 70 directly contacted to the external tab 68 of the current collector 62, preferably by welding, to provide for direct electrical connection to the cathode electrode.

The present current collector 62 is readily incorporated into alkali metal/solid cathode or alkali metal/oxyhalide electrochemical cells of both solid cathode and liquid electrolyte types without having to be changed or otherwise modified itself. In the solid cathode type, for example a lithium-solid cathode cell, a solid cathode material such as silver vanadium oxide or copper silver vanadium oxide is contained within casing 12 and surrounded by a separator. A lithium anode also is in the casing. Casing 12 is of a conductive material preferably selected from the group consisting of nickel, aluminum, stainless steel, mild steel and titanium. External cell electrical connection is provided by the terminal lead 70 and by a contact region comprising lid 24 or the entire conductive casing 12, which are insulated from the terminal lead 70.

In the liquid cathode/electrolyte or catholyte type cell, for example a lithium-oxyhalide cell, liquid catholyte fills the casing interior and is in operative contact with the anode and with the cathode element comprising the cathode current collector 62 according to the present invention sandwiched between opposed carbonaceous plates. A separator is disposed between the anode and the carbonaceous cathode. For a more detailed description of such a liquid electrolyte cell reference may be made to U.S. Pat. No. 4,246,327 to Skarstad et al., which is assigned to the assignee of the present invention, the disclosure of which is hereby incorporated by reference.

Referring now to FIG. 4, the cell 60 according to this embodiment of the present invention is of the liquid electrolyte type comprising a cathode electrode having a body 72 of solid cathode material in the form of plates 36, 38 pressed together and bonded against the cathode current collector 62. The cathode active material is preferably comprised of a metal, a metal oxide, a mixed metal oxide or a metal sulfide, and the cathode current collector 62 is fabricated from a thin sheet of metal selected from the group consisting of nickel, aluminum, stainless steel, mild steel and titanium, with titanium being preferred.

While the terminal lead 70 is shown connected to the external tab 68 in FIG. 7, it will be apparent to those skilled in the art that terminal lead 70 can be directly connected to the current collector 62 at any contact point along the extent of the internal tab 66 and the external tab 68. This construction eliminates the need for the provision of the prior art coupling element 48 (FIGS. 2 and 3).

Thus, depending on the desired position of terminal lead 70 in the cell 60, connection tabs 66 and 68 can be of various lengths or shapes to provide additional flexibility in connecting the terminal lead 70 to the current collector 62. For example, if the design of the cell 60 requires terminal lead 70 to be positioned closer to or farther away from the center of lid 24, the current collector 62 of the present invention easily accommodates the design changes without having to be changed itself. Terminal lead 70 is simply connected to a different contact point on either the internal connection tab 66 or the external connection tab 68. Of course, there may be cell constructions where it is desirable to connect terminal leads to both the internal tab and the external tab of the present current collector 62, and such configurations are readily provided for by current collector 62.

Cell 60 further includes an alkali metal anode electrode, generally designated 74, comprising a unitary, conductive member which serves as the anode current collector and is fabricated from a thin sheet of metal, preferably nickel, having a pair of wing-like sections 76 and 78 joined by an intermediate web section 80. The preferred alkali metal for the anode is lithium. Lithium anode elements 82 and 84 are in pressure bonded contact with and carried by corresponding ones of the electrode wing sections 76 and 78, respectively. The wing-like sections 76 and 78 are of mesh formation to facilitate adherence to the lithium anode elements 82, 84. The lithium anode elements 82 and 84 are of a similar shape or configuration as the corresponding electrode wing sections 76 and 78, respectively, but of a slightly larger size or surface area so as to define a marginal or peripheral extension or border surrounding the perimeter of each wing section. Thus, the length and width of each of the lithium anode elements 82 and 84 is slightly greater than the length and width of the corresponding electrode wing section 76 and 78 with the anode elements terminating at an edge 86 a short distance from electrode web section 80.

To construct an anode-cathode subassembly according to the present invention, the electrode wing sections 76, 78 with the associated anode lithium elements 82, 84 are folded relative to web section 80 and toward each other and in a manner to place the lithium anode elements 82, 84 in operative contact with the oppositely directed surfaces 88 and 90 of the cathode body 72. In particular, lithium anode element 82 is in operative contact with the cathode body surface 88 through a thin sheet of separator material 92. Similarly, lithium anode element 84 is in operative contact with cathode body surface 90 through a thin sheet of separator material 94 such that separator sheets 92 and 94 surround and envelope the cathode body 72 to prevent direct physical contact with the anode plates 82, 84. Shielding and insulating sheets (not shown) are also provided between the web section 80 of the anode current collector and the cathode electrode 72. The terminal lead 70 connected to the current collector 62 of the cathode electrode 72 extends through a header assembly comprising the glass-to-metal seal 32 fitted in the lid 24.

Cell 60 is completed by a liquid electrolyte 96 provided in casing 12 and sealed therein by the provision of the closure means 28 sealed in opening 26 to hermetically close the cell 60. Lead 70 is the positive electrical terminal, being connected to the cathode body 72. With anode electrode 74 being in operative contact with the conductive casing 12 through the web section 80 of the anode current collector in electrical contact therewith, the cell 60 of this embodiment of the present invention is in a case-negative electrical configuration.

By way of example, in an illustrative cell, the active material of cathode body 72 is a silver vanadium oxide cathode material as described in U.S. Pat. Nos. 4,310,609 and 4,391,729 to Liang et al., or copper silver vanadium oxide as described in U.S. Pat. Nos. 5,472,810 and 5,516,340 to Takeuchi et al., all assigned to the assignee of the present invention, the disclosures of which are hereby incorporated by reference. Cathode current collector 62 is of titanium and terminal lead 70 is of molybdenum, separators 92, 94 are of polypropylene, electrolyte 96 is a 1.0M to 1.4M solution of $LiAsF_6$ or $LiPF_6$ in a 50:50 mixture of, by volume, 1,2-dimethoxyethane and propylene carbonate, glass seal 32 is of TA-23 Hermetic sealing glass, and closure means 28 is of stainless steel.

The current collector 62 of the present invention can also be employed in a cell having a case-positive electrical configuration. In particular, in the embodiments of FIGS. 4 to 7, with the lithium anode elements 82, 84 contacting the conductive cell casing 12, the cell 60 is in a case-negative electrical configuration. A case-positive electrical configuration is provided by placing the cathode parts in contact with the conductive cell casing 12. In particular, and referring to the anode-cathode subassembly of FIG. 4, a case-positive electrical configuration is provided by replacing lithium anode elements 82, 84 with cathode plates 36, 38 on the electrode wing sections 76, 78. Accordingly, cathode body 72 would be replaced by the pair of lithium anode elements 82, 84 sandwiched together and against the current collector 62 of the present invention serving as an anode current collector which, in turn, is connected to the terminal lead 70 via electrical contact to at least one of the internal connection tab 66 and the external connection tab 68, and insulated from lid 24 by the glass-to-metal seal 32. With the cathode parts in contact with electrode wing sections 76, 78 and with the electrode web section 80 in contact with the cell casing 12, a cell is provided in a case-positive electrical configuration. In all other respects, the anode current collector in the case-positive configuration is similar to that previously described with respect to cell 60 having the case-negative configuration.

It is therefore apparent that the present invention accomplishes its intended objects. While embodiments of the present invention have been described in detail, that is for the purpose of illustration, not limitation.

What is claimed is:

1. A current collector means, which comprises:
   a) a substrate having a perimeter defining an internal support surface intended for supporting an electrode active material;
   b) an internal connection tab mostly surrounded by the support surface; and
   c) an external connection tab continuous with a portion of the internal connection tab not surrounded by the support surface such that the perimeter of the current collector is only broken by a width of the internal tab continuous with and substantially co-equal to that of the external tab throughout the extent of the tabs, wherein the internal tab and the external tab provide for selective connection of the current collector means to a lead means.

2. The current collector means of claim 1 wherein the support surface is apertured.

3. The current collector means of claim 1 wherein the support surface, the internal tab and the external tab are comprised of a metal selected from the group consisting of nickel, aluminum, stainless steel, mild steel and titanium, and mixtures thereof.

4. The current collector means of claim 1 wherein the internal tab is co-planar with the support surface.

5. An electrode assembly for an electrochemical cell, the electrode assembly comprising:
   a) a current collector means, which comprises:
      i) a substrate having a perimeter defining an internal support surface intended for supporting an electrode active material;
      ii) an internal connection tab mostly surrounded by the support surface; and
      iii) an external connection tab continuous with a portion of the internal connection tab not surrounded by the support surface such that the perimeter of the current collector is only broken by a width of the internal tab continuous with and substantially co-equal to that of the external tab throughout the extent of the tabs;
   b) an electrode active material in electrical contact with the support surface; and
   c) a terminal lead having a first end and a second end, wherein the first end of the terminal lead is selectively connectable to at least one of the internal connection tab or the external connection tab, or both, and wherein the second end of the terminal lead is adapted for connection to an electrical load.

6. The electrode of claim 5 wherein the support surface is apertured.

7. The electrode of claim 5 wherein the support surface, the internal tab and the external tab are comprised of a metal selected from the group consisting of nickel, aluminum, stainless steel, mild steel and titanium, and mixtures thereof.

8. The electrode of claim 5 wherein the internal tab is co-planar with the support surface.

9. The electrode of claim 5 wherein the electrode active material is characterized as having been calendared to the support surface.

10. An electrochemical cell, which comprises:
   a) a casing having a surrounding side wall extending to an open end of the casing;
   b) a lid sealed to the open end of the casing;
   c) a first electrode and a second electrode having a separator means disposed therebetween inside the casing in electrical association with each other, wherein at least one of the electrodes includes a current collector means, the current collector means comprising:
      i) a substrate having a perimeter defining an internal support surface intended for supporting an electrode active material;
      ii) an internal connection tab mostly surrounded by the support surface;
      iii) an external connection tab continuous with a portion of the internal connection tab not surrounded by the support surface, wherein the internal connection tab and the external connection tab extend along a first axis; and
      iv) an electrode active material in electrical contact with the support surface;
   d) a terminal lead having a first end disposed inside the casing and a second end adapted to be connected to a load, wherein the terminal lead extends through an opening in the lid along a second axis between the first end and a portion of the terminal lead extending through the lid opening such that the second axis of the terminal lead is substantially perpendicular to the first axis of the internal and external connection tabs when the first end of the terminal lead is selectively connected to the current collector at any position along the extent of the internal connection tab and the external connection tab so that the terminal lead exits the lid through the opening provided therein corresponding to any position along the lid substantially normal to a combined length of the internal and external connection tabs; and e) an electrolyte solution activating the first and second electrodes.

11. The electrochemical cell of claim 10 wherein a width of the internal tab is continuous with and substantially co-equal to that of the external tab.

12. The electrochemical cell of claim 10 wherein the support surface is apertured.

13. The electrochemical cell of claim 10 wherein the support surface, the internal tab and the external tab are comprised of a metal selected from the group consisting of nickel, aluminum, stainless steel, mild steel and titanium, and mixtures thereof.

14. The electrochemical cell of claim 10 wherein the internal tab is co-planar with the support surface.

15. The electrochemical cell of claim 10 wherein the casing is conductive and serves as a terminal for one of the electrodes.

16. The electrochemical cell of claim 15 wherein the terminal lead is selectively connected to the conductive casing and at least one of the internal connection tab and the external connection tab, or both.

17. The electrochemical cell of claim 15 wherein the casing is comprised of a metal selected from the group consisting of titanium, aluminum, nickel, stainless steel and tantalum, and mixtures thereof.

18. The electrochemical cell of claim 10 wherein the first electrode is a cathode comprising a cathode active material in electrical contact with the support surface of the current collector means and wherein the terminal lead for the cathode is selectively connected to at least one of the internal connection tab and the external connection tab, or both.

19. The electrochemical cell of claim 18 wherein the second electrode is an anode connected to the casing in a case-negative configuration.

20. The electrochemical cell of claim 10 wherein the first electrode is a solid cathode comprising a cathode active material selected from the group consisting of a metal, a metal oxide, a mixed metal oxide and a metal sulfide, and mixtures thereof in electrical contact with the support surface of the current collector means, and wherein the terminal lead for the cathode is selectively connected to at least one of the internal connection tab and the external connection tab, or both, and wherein the second electrode is the anode comprised of an alkali metal.

21. The electrochemical cell of claim 20 wherein the casing is conductive and the anode is connected to the casing in a case-negative configuration.

22. The electrochemical cell of claim 10 wherein the terminal lead extends through a glass-to-metal seal provided in the opening in the lid.

23. In an electrochemical cell comprising an anode and a liquid cathode/electrolyte, the improvement comprising:

a current collector for the cathode electrode, the current collector comprising a conductive substrate having a perimeter defining an internal support surface supporting a carbon-containing material in electrical contact with the conductive support surface having an internal connection tab mostly surrounded by the support surface and an external connection tab continuous with a portion of the internal connection tab not surrounded by the support surface such that the perimeter of the current collector is only broken by a width of the internal tab continuous with and substantially co-equal to that of the external tab throughout the extent of the tabs, and a terminal lead selectively connected to at least one of the internal connection tab and external connection tab, or both.

24. The electrochemical cell of claim 23 wherein the support surface, the internal tab and the external tab are comprised of a metal selected from the group consisting of nickel, aluminum, stainless steel, mild steel and titanium, and mixtures thereof.

25. The electrochemical cell of claim 23 wherein the internal tab is co-planar with the support surface.

26. A method of providing an electrode for an electrochemical cell, comprising the steps of:

a) providing a current collector comprising a substrate having a perimeter defining an internal support surface; an internal connection tab mostly surrounded by the support surface; and an external connection tab continuous with a portion of the internal connection tab not surrounded by the support surface such that the perimeter of the current collector is only broken by a width of the internal tab continuous with and substantially co-equal to that of the external tab throughout the extent of the tabs;

b) contacting an electrode active material to the support surface; and c) selectively connecting a terminal lead to at least one of the internal connection tab and the external connection tab, or both.

27. The method of claim 26 including providing the current collector comprising a conductive material selected from one of the group consisting of nickel, aluminum, stainless steel, mild steel and titanium, and mixtures thereof.

28. A method of providing an electrochemical cell, comprising the steps of:

a) providing a casing having a surrounding side wall extending to an open end of the casing;

b) sealing a lid to the open end of the casing;

c) providing a first electrode and a second electrode, wherein providing at least one of the electrodes comprises the steps of:

i) providing a current collector comprising a substrate having a perimeter defining an internal support surface, an internal connection tab mostly surrounded by the support surface, and an external connection tab continuous with a portion of the internal connection tab not surrounded by the support surface, wherein the internal connection tab and the external connection tab extend along a first axis; and ii) contacting an electrode active material to the support surface;

d) providing a terminal lead having a first end disposed inside the casing and a second end adapted to be connected to a load, wherein the terminal lead extends through an opening in the lid along a second axis between the first end and a portion of the terminal lead extending through the lid opening such that the second axis of the terminal lead is substantially perpendicular to the first axis of the internal and external connection tabs when the first end of the terminal lead is selectively connected to the current collector at any position along the extent of the internal and external connection tabs so that the terminal lead exits the lid through the opening provided therein corresponding to any position along the lid substantially normal to the combined length of the internal and external connection tabs;

e) operatively associating the first electrode and the second electrode with each other inside the casing; and f) activating the first electrode and the second electrode with an electrolyte.

29. The method of claim 28 including providing a width of the internal tab as a continuation of and substantially equal to that of the external tab.

30. The method of claim 28 including providing the current collector comprising a conductive material selected from one of the group consisting of nickel, aluminum, stainless steel, mild steel and titanium, and mixtures thereof.

31. A method of providing a current collector, comprising the steps of:

a) providing a conductive substrate having a perimeter defining an internal support surface;

b) providing an internal connection tab mostly surrounded by the support surface; and c) providing an external connection tab continuous with a portion of the internal connection tab not surrounded by the support surface such that the perimeter of the current collector is only broken by a width of the internal tab continuous with and substantially co-equal to that of the external tab throughout the extent of the tabs.

* * * * *